United States Patent [19]  [11] Patent Number: 4,673,201
Dearden et al.  [45] Date of Patent: Jun. 16, 1987

[54] PIPE CONNECTOR

[75] Inventors: Geoffrey C. Dearden; Edward J. Speare, both of Bedford; Katsuo Ueno, Hertfordshire, all of England; Donald N. Jones, Aberdeenshire, Scotland

[73] Assignees: Hunting Oilfield Services (UK) Limited, Aberdeen, Scotland; Kawasaki Steel Corporation, Kobe, Japan

[21] Appl. No.: 645,017

[22] Filed: Aug. 28, 1984

[30] Foreign Application Priority Data

Sep. 1, 1983 [GB] United Kingdom ............... 8323508

[51] Int. Cl.⁴ .............................................. F16L 15/00
[52] U.S. Cl. .................................... 285/333; 285/334; 285/390; 285/351
[58] Field of Search .................. 285/332.2, 333, 334, 285/351, 355, 390, 328, 332.3, 334.3, 334.4, 350, 382

[56] References Cited

U.S. PATENT DOCUMENTS

| 814,491 | 3/1906 | Westerman | 285/333 |
|---|---|---|---|
| 1,507,138 | 9/1924 | Pierce | 285/334.5 |
| 1,697,815 | 1/1929 | Hagstedt | 285/334.5 |
| 1,889,870 | 12/1932 | Montgomery | 285/333 |
| 2,332,355 | 10/1943 | Stecher | 285/334.4 |
| 2,532,632 | 12/1950 | Mac Arthur | 285/333 |
| 2,574,081 | 11/1951 | Abegg | 285/334 |
| 3,850,461 | 11/1974 | Fujioka | 285/332.2 |
| 4,296,954 | 10/1981 | Fujimaki et al. | 285/350 |
| 4,373,750 | 2/1983 | Mantelle | 285/334 |
| 4,377,302 | 3/1983 | Kohyama | 285/390 |
| 4,494,777 | 1/1985 | Duret | 285/334 |

FOREIGN PATENT DOCUMENTS

| 2438387 | 2/1976 | Fed. Rep. of Germany | 285/333 |
|---|---|---|---|
| 786652 | 11/1957 | United Kingdom . | |
| 799028 | 7/1958 | United Kingdom . | |
| 806553 | 12/1958 | United Kingdom . | |
| 957858 | 5/1964 | United Kingdom . | |
| 1224136 | 3/1971 | United Kingdom | 285/334 |
| 1521133 | 8/1978 | United Kingdom | 285/334 |
| 2074685 | 11/1981 | United Kingdom | 285/333 |

Primary Examiner—Cornelius J. Husar
Assistant Examiner—Eric K. Nicholson
Attorney, Agent, or Firm—Balogh, Kramer, Dvorak, Genova & Traub

[57] ABSTRACT

A connector, for example for connecting pipe sections, comprises a female member having threaded internal circumferential surfaces at each end, for engagement with a pair of male members each of which is provided with a threaded external circumferential surface. Each male member is provided with an annular nose having an axially directed primary sealing surface for sealing abutment with the primary sealing surface of the other male member, and a circumferential secondary sealing surface for sealing against a secondary sealing surface on the female member. The sealing surfaces being initially shaped so that when the noses are initially brought into contact there are progressively widening axial and radial gaps therebetween which are closed by deformation of the noses when the members are fully engaged together.

12 Claims, 8 Drawing Figures

PIPE CONNECTOR

BACKGROUND OF THE INVENTION

1. Field of the Invention

The present invention relates to a pipe connector for connecting tubular members, for example pipes for use in conveying pressurized fluids, such as steam, gas or oil, for example in oil or gas exploration and production.

2. Description of the Prior Art

The main type of pipe connector presently used for tubings and casings comprises a female member having an internal circumferential surface provided with a thread at each end thereof, and a pair of male members each having an external circumferential surface corresponding to the circumferential surfaces of the female member and provided with a thread for threaded engagement with the female member. To seal the connector against internal pressure, an axially directed end surface on the free end of each male member is brought into abutment with a corresponding surface provided internally in the female member and the end of the respective male member is then compressed against the surface of the female member. The compressive force is obtained by screwing the members together tightly and is usually maintained by providing an interference fit between crest and root surfaces of the threads. The integrity of the seal provided in this way can be substantially reduced by the application of a tensile force to the connector or by inadvertent unscrewing of the members of the connector, for example resulting from a lateral blow to one of the members. The greater the compressed volume of the male members and therefore the greater the angle of relative rotation of the male and female members producing this compression, the greater is the strain energy stored in the seal and the better is the connector able to withstand tangential or axial forces or impulses or negative torque tending to cause unscrewing which would reduce the integrity of the seal.

However, there has not been a pipe connected which meets such a requirement. Most of pipe connectors hitherto used tend to reduce the integrity of the seals substantially when any external force acts them.

SUMMARY OF THE INVENTION

It is a primary object of the invention to provide an improved pipe connector which eliminates the disadvantage of the prior art.

It is another object of the invention to provide a pipe connector having a greater volume of male members to be compressed and therefore a greater angle of relative rotation of the male and female members so as to store a greater strain energy in the seal, thereby withstanding any force or torque tending to cause unscrewing which would reduce the integrity of the seal.

According to the present invention there is provided a pipe connector including a female member having an internal circumferential surface at each end each provided with a thread, and a pair of male members each having an external circumferential surface corresponding to a respective one of the circumferential surfaces of the female member and provided with a thread for threaded engagement with the corresponding thread of the female member, each male member being provided at its free end with an annular nose having a generally axially directed primary sealing surface for generally axial abutment with the primary sealing surface of the nose of the other male member, and an external circumferential secondary sealing surface for generally radial contact over a part at least of its length with an internal circumferential secondary sealing surface provided on the female member intermediate the internal circumferential surfaces thereof, wherein the primary sealing surfaces of the male members are initially shaped so that, when they are initially brought into contact, there is a gap between parts at least of the surfaces which progressively widens in a radially inwardly direction, and the secondary sealing surfaces are initially shaped so that there is initially a gap therebetween at least in the region of the contacting primary sealing surfaces, the gaps being substantially closed when the members are fully engaged together.

The primary sealing surfaces of the male members may be generally frusto-conical or spherical.

The gap between the secondary sealing surfaces of each male member and the female member may increase in radial width in the directions of the free ends of the male members and may be obtained by providing the female member with a generally cylindrical bi-frusto-conical or spherical sealing surface and each male member with a generally frusto-conical, spherical or cylindrical sealing surface.

The above described connector may be assembled by first engaging one male member fully with the female member and then introducing the other male member into the female member until the noses of the male members come into contact. Additional axially directed force is then applied until the members are fully engaged to compress the two male members together and cause deformation of their noses. The force will additionally cause tensioning of the corresponding part of the female member. Advantageously shoulders may be provided on each male member and on the female member which may come into contact at the limit of the required axial movement of the first engaged male member. The shoulders advantageously are provided by annular radial surfaces arranged between the root of the nose and the adjacent end of the threaded circumferential surface of each male member and correspondingly on the female member.

The threads of the male and female members may have any suitable shape but may advantageously be modified to increase the effective length of each male member which is compressed, for example as described in co-pending U.K. patent applications Nos. 8323348, 8323349 and 8323858, the disclosures of which are incorporated herein by this reference.

Embodiments according to the present invention will now be described, by way of example only, with reference to the accomanying drawings.

DETAILED DESCRIPTION OF THE PREFERRED EMBODIMENT

Figure 1:
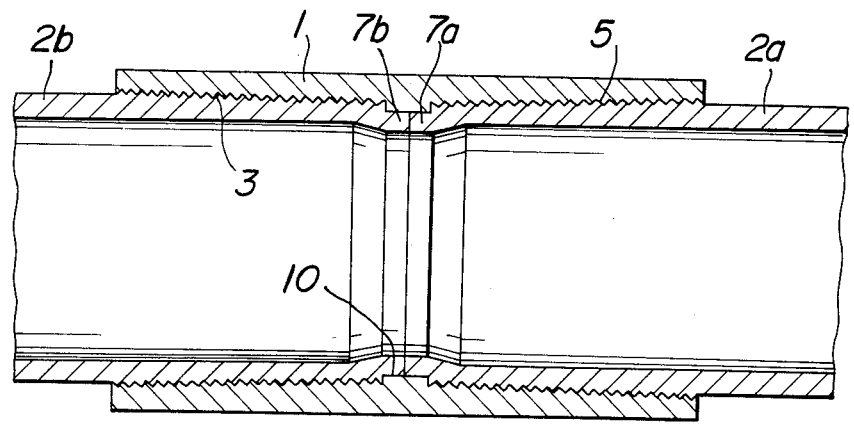
FIG. 1 is an axial section through an embodiment of connector according to the present invention showing the members thereof fully engaged together.
Figure 2:
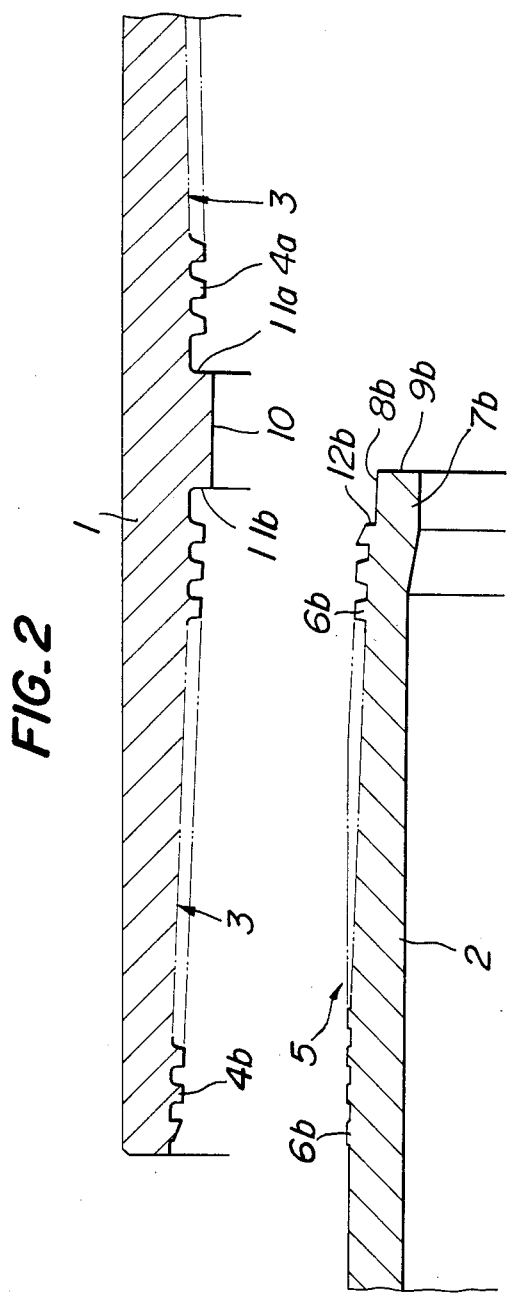
FIG. 2 is an enlarged diagrammatic axial sectional view of parts of the members of the connector of FIG. 1 before engagement.

The connector shown in FIGS. 1 and 2 comprises a female member 1 and a pair of male members 2 engageable therewith. The female member 1 is in the form of a sleeve and has an internal circumferential surface 3 at each end, each provided with a thread 4(a), (b). As shown each surface 3 is frusto-conical, each with the apex of the cone projecting inwardly of the sleeve, but each surface may be cylindrical. Each male member 2 has an external circumferential surface 5 corresponding to the respective surface 3 of the female member and provided with a thread 6(a), (b) engageable with the thread of the female member.

Each male member 2 has at its free end an axially projecting annular nose 7(a), (b) having an unthreaded external circumferential secondary sealing surface 8(a), (b) and an axially directed primary sealaing surface 9(a), (b). The female member 1 has, correspondingly, between the threaded circumferential surfaces 3 an unthreaded internal circumferential secondary sealing surface 10.

As shown, sealing surface 10 of the female member is cylindrical and surfaces 8(a), (b) of the male members are frusto-conical, with the apex of the respective cone directed outwardly of the respective male member. Surfaces 9(a), (b) are also frusto-conical with the apex of the respective cone directed inwardly of the respective male member.

To limit axial movement of the male members 2 into the female member 1, shoulders 11(a), (b) and 12(a), (b) are provided on the female member and male members respectively. As shown, these shoulders are advantageously provided at the ends of surface 10 on the female member and at the root of the nose on each male member. Surfaces 11(a), (b) are conveniently provided by forming annular grooves in the female member at either end of surface 10 with which the last turns of each thread 4(a), (b) merge. Surfaces 12(a), (b) are provided by cutting an annular surface in the last turn of the thread 6(a), (b) on each male member. Advantageously, as shown, the largest diameter of surfaces 8(a), (b) is significantly smaller than the smallest diameter of the thread 6(a), (b) of the male members so that the noses 7(a), (b) do not interfere with the thread of the female member during engagement of a male member with the female member.

Figure 3:
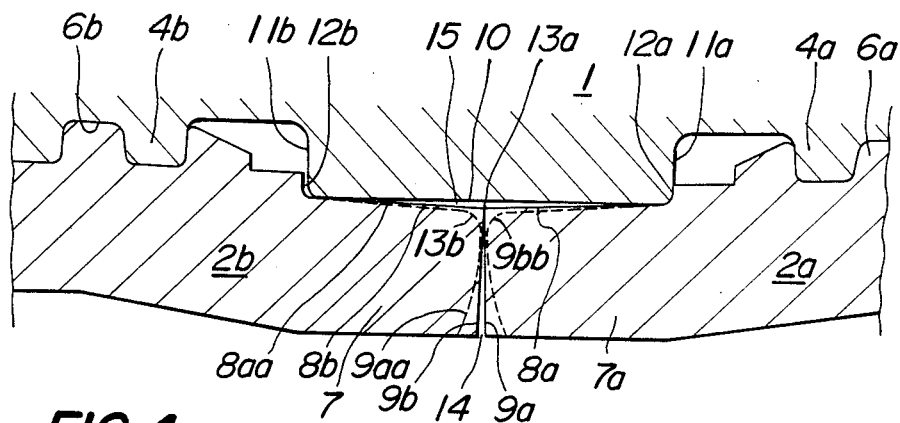
FIGS. 3 and 4 are enlarged diagrammatic sectional views showing the members of the connector of FIG. 1 during engagement and on full engagement respectively.

To assemble the above described connector, one male member, for example member 2a, is first engaged in the female member to its fullest extent at which point shoulders 11(a), (b), 12(a), (b) come into abutment and then a torque is applied to a predetermined level. The other male member, for example member 2b, is then engaged with the other end of the female member and engagement proceeds until the nose 7b of member 2b comes into contact with the nose 7a of member 2a, as shown in FIG. 3. At this point there is only line contact along the radially outer edges 13(a), (b) of the sealing surfaces 9(a), (b) of the noses 7(a), (b), and there is a gap 14 between the remainder of surfaces 9(a), (b) which progressively widens in a radially inward direction. Additionally the diameters of surfaces 8(a), (b) and 10 are arranged so that there is a gap 15 between them which progressively widens in a direction from the root of the respective nose towards the edge 13(a), (b). This gap may extend the full length of the overlap of surfaces 8(a), (b), 10 as shown, or the surfaces may be in contact at or adjacent the junctions between surface 10 and shoulders 11(a), (b).

Figure 4:
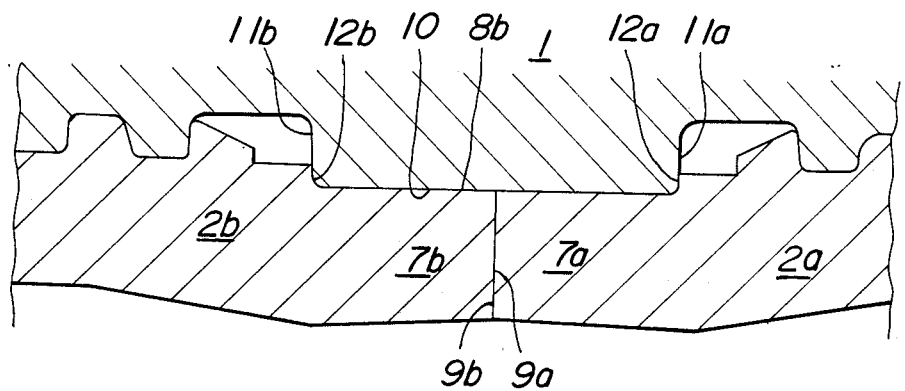

The member 2b is then screwed further into member 1 under the application of a higher torque to apply a higher axial force to compress and deform the noses 7(a), 7(b) to bring surfaces 9(a), 9(b) and 8(a), (b) and 10 into sealing contact. During this period the noses are compressed and in effect pivot about their roots, the line 13 spreading radially outwardly until it coincides with surface 10 to bring at least parts of surfaces 8(a), 8(b), 10 in the region of surfaces 9(a), (b) into contact, and surfaces 9(a), 9(b) into substantially full abutment, as shown in FIG. 4. At this point shoulder 12b on member 2b may be slightly spaced from shoulder 11b as may shoulder 12a on member 2a.

The angles of the frusto-conical surfaces 9(a), (b) are selected to ensure the required degree of deformation to obtain the required stored energy, in dependence on the load which can be sustained by the threads 4(a), (b), 6(a), (b). The angle of the frusto-conical surfaces 8(a), (b) is selected in dependence on the angle of surfaces 9(a), (b) to ensure that the gap 15 is sufficient to permit sufficient deformation of the noses 7(a), (b) to bring surfaces 9(a), (b) into contact and to obtain a secondary seal between at least parts of surfaces 8(a), (b) and 10(a), (b).

In a modification of the above described embodiment, surfaces 8(a), (b) and 9(a), (b) may be spherical rather than frusto-conical, as shown by the broken lines 8aa, 9aa in FIG. 3, and may merge in a portion 9bb having a relatively small radius of curvature. The line of contact between the noses 7(a), (b) then lies radially inwardly of line 13 but is positioned radially outwardly of the axes about which the noses pivot under axial compression, to ensure that the noses pivot outwardly to bring surfaces 8aa, 9aa and 10 into sealing contact, as shown in FIG. 4.

It will be appreciated that a substantial amount of energy is stored in the noses 7(a), (b), in the adjacent portions of male members 2 and in the corresponding portion of the female member 1 by the deformation and compression of the noses and adjacent portions of the male members to bring surfaces 9(a), (b) into contact, and the corresponding extension of the female member, which enables the connector to better withstand axial forces tending to reduce the integrity of the seals provided therein. Furthermore the members 1, 2 are rotated through a substantially greater angle than heretofore in deforming and compressing the noses 7(a), (b) and extending the female member between the stages shown in FIGS. 3 and 4, which again reduces the risks of substantial reduction in integrity of the seal provided by surfaces 9(a), (b) by angular or axial forces tending to move members 2a, 2b axially apart. Additionally, because the members 2a, 2b themselves provide the sealing contact, the stored energy is in effect doubled overall because, when considering either of members 2a, 2b and member 1 the stored energy in both noses 7(a), (b) and the corresponding length of the female member is available.

Figure 5:
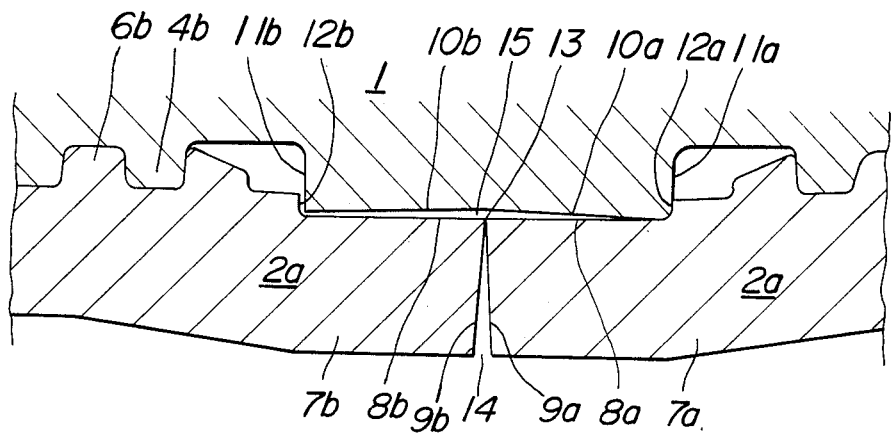
FIGS. 5 and 6 are views similar to those of FIGS. 3 and 4 showing a modification of the connector of FIG. 1.
Figure 6:
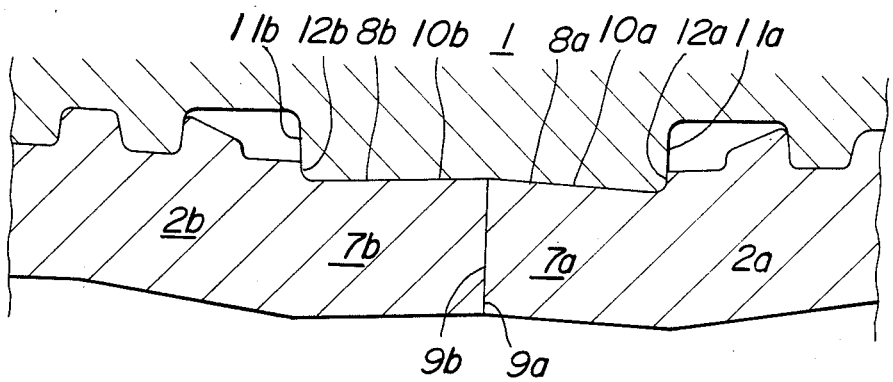
Figure 8:
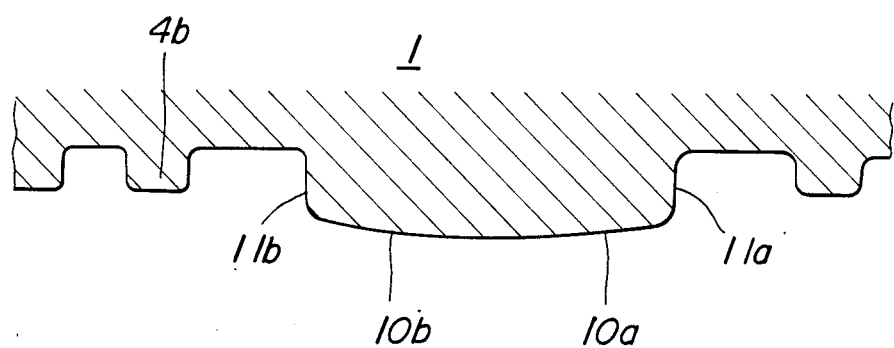
FIG. 8 is an enlarged diagrammatic sectional view of a modified male member according to the invention.

It will be appreciated that the gap 15 between surfaces 8(a), (b) and 10 (or 8aa and 10) may be obtained in other ways. For example, as shown in FIGS. 5 and 6, surfaces 8(a), (b) may be cylindrical and surface 10 may as shown be bi-frusto-conical providing two frusto-conical surface portions 10a, 10b for the members 2a, 2b, the apex of the cone of the respective surface portion 10a, 10b being directed inwardly of the corresponding male member 2a, 2b. In a modification surface 10 may be spherical and symmetrical about the center of surface 10, which is exaggeratedly illustrated in FIG. 8(a), (b). Alternatively, both surfaces 8 and 10 may be slightly frusto-conical or spherical.

Figure 7:
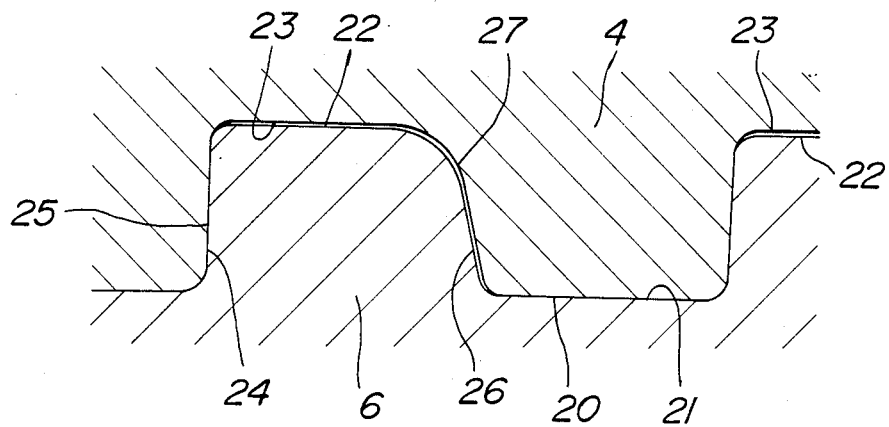
FIG. 7 is an axial sectional view showing a form of the threads used in the connector of FIG. 1.

The threads 4(a), (b), 6(a), (b) of the members may have any suitable shape and form. For example the threads 4(a), (b) and 6(a), (b) may have the shape as shown in FIG. 7 throughout their full extents. Alternatively threads 6(a), (b) may, adjacent the ends remote from noses 7(a), (b), have a vanishing portion, i.e. of reducing radial extent, the crests of the threads lying on a cylinder. The threads 4(a), (b), 6(a), (b) may be dimensioned so that there is a slight clearance, contact or an interference fit between the crest surface of one thread and the root surface of the gap between adjacent turns of the other thread and a slight clearance between the crest surface of the other thread and the root surface of the gap between adjacent turns of the one thread, when the members 1, 2 are fully engaged together. As shown an interference fit is provided between the crest surface 20 of thread 4 and the root surface 21 of the gap between thread 6, a slight clearance being provided between the corresponding crest and root surfaces 22, 23 of threads 6 and 4. The leading flanks 24, 25 of the threads are preferably only slightly inclined to the radial plane, for example at an angle of 3°, whereas the trailing flanks 26, 27 of the threads are more inclined. The threads may, for example, have relative proportions of width and height based on an API standard buttress thread and may be modified as described in any one of the above referred to co-pending U.K. Applications Nos. 8323348, 8323349 and 8323858.

The threads 4(a), (b), 6(a), (b) may, as described above be single start threads or may be multistart threads.

With the above described connector, the male members 2 may be made integrally with pipe sections or may be formed separately and fixed to pipe sections, for example by welding or otherwise. Particularly for use in oil and gas exploration and production, the members are made of metal, for example steel. The female member may be made of the same grade of steel as the male members or a higher grade to minimize the overall dimensions of the female member and therefore of the connector. It will be appreciated that the above described connector avoids corrosion problems arising from the use of dissimilar materials for the male and female members because fluids carried by pipes connected to the male members will not contact the female member.

What is claimed is:

1. A pipe connector including a female member having an internal circumferential surface at each end, each end provided with an internal thread, and a pair of male members each having an external circumferential surface corresponding to a respective one of the circumferential surfaces of the female member and provided with a thread for threaded engagement with the corresponding thread of the female member, the female member being provided internally with shoulders for limiting axial movement of the male members therein, each male member being provided with a corresponding shoulder, and each male member being provided at its end face with an annular nose having an axially directed primary sealing surface for general axial abutment with the primary sealing surface of the nose of the other male member, and an adjacent external circumferential secondary sealing surface for generally radial contact over its length with an internal circumferential secondary sealing surface provided on the female member intermediate the internal circumferential surfaces thereof, wherein the primary sealing surfaces of the male members are initially shaped so that, when they are initially brought into contact, there is a gap between parts of the surfaces which progressively widens in a radially inwardly direction, and the male and female secondary sealing surfaces are initially shaped so, and have diameters arranged so, that there is always initially a gap therebetween which extends the length of overlap of the male and female secondary sealing surfaces in the region of the contacting primary sealing surfaces, the gaps being closed when the male members and the female member are fully engaged together, the ends thereof abutting against each other and moving radially outwardly to fill the gaps.

2. A pipe connector as set forth in claim 1, wherein the primary sealing surfaces of the male members are generally frusto-conical, the apices of the cones being directed inwardly of the respective male member.

3. A pipe connector as set forth in claim 1, wherein the primary sealing surfaces of the male members are generally spherical.

4. A pipe connector as set forth in claim 1, wherein the secondary sealing surface of the female member is generally cylindrical.

5. A pipe connector as set forth in claim 1, wherein the secondary sealing surface of the female member is generally spherical.

6. A pipe connector as set forth in claim 1, wherein the secondary sealing surface of the female member comprises two generally frusto-conical portions, the apices of the portions being directed away from each other.

7. A pipe connector as set forth in claim 1, wherein the secondary sealing surfaces of the male members are generally frusto-conical, the apices of the cones being directed outwardly of the respective male member.

8. A pipe connector as set forth in claim 1, wherein the secondary sealing surfaces of the male members are spherical and such that said gap between a respective secondary sealing surface of a respective male member and the secondary sealing surface of the female member widens progressively in the direction of the free end of the male member.

9. A pipe connector as set forth in claim 5, wherein the secondary sealing surfaces of the male members are cylindrical.

10. A pipe connector as set forth in claim 1, wherein the shoulders on the female member are provided intermediate the secondary sealing surface and the internal circumferential surfaces.

11. A pipe connector as set forth in claim 6, wherein the secondary sealing surfaces of the male members are cylindrical.

12. A pipe connector as set forth in claim 10, wherein the male and female secondary sealing surfaces are initially shaped so and have diameters arranged so that there is always initially a gap therebetween, the male and female secondary sealing surfaces being initially in contact only at or adjacent junctions between the secondary sealing surfaces and said shoulders.

* * * * *